US011931765B2

(12) United States Patent
Olson et al.

(10) Patent No.: US 11,931,765 B2
(45) Date of Patent: Mar. 19, 2024

(54) PRESSURE-FED ACCESSORIES ADAPTER FOR AN AIRLESS SPRAY GUN

(71) Applicant: Graco Minnesota Inc., Minneapolis, MN (US)

(72) Inventors: Diane L. Olson, Elk River, MN (US); Steven Dale Becker, Blaine, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 138 days.

(21) Appl. No.: 17/350,067

(22) Filed: Jun. 17, 2021

(65) Prior Publication Data

US 2021/0308712 A1 Oct. 7, 2021

Related U.S. Application Data

(63) Continuation of application No. 15/571,142, filed as application No. PCT/US2016/038377 on Jun. 20, 2016, now Pat. No. 11,052,418.

(Continued)

(51) Int. Cl.

*B05C 1/08* (2006.01)

*B05B 9/08* (2006.01)

(Continued)

(52) U.S. Cl.

CPC .......... *B05C 1/0813* (2013.01); *B05B 9/0861* (2013.01); *B05B 15/65* (2018.02);

(Continued)

(58) Field of Classification Search

CPC .............. B05B 9/01; B05B 9/08–0894; B05B 7/02–129; B05B 13/0278;

(Continued)

(56) References Cited

U.S. PATENT DOCUMENTS 3,700,174 A * 10/1972 Beck ..................... B05B 15/656 239/526

3,915,382 A * 10/1975 Davis .................... B05B 15/628 239/281

(Continued)

FOREIGN PATENT DOCUMENTS

CN 202538991 U 11/2012

CN 103464324 A 12/2013

(Continued)

OTHER PUBLICATIONS

Chinese Office Action for Chinese Patent Application No. 2016800306546, dated Dec. 18, 2018, 15 pages.

(Continued)

*Primary Examiner* — Cody J Lieuwen

(74) *Attorney, Agent, or Firm* — Kinney & Lange, P.A.

(57) ABSTRACT

A spray gun adapter establishes fluid communication between a fluid pump of a handheld airless spray gun and an applicator accessory. The adapter comprises an adapter body, a head attached to the adapter body, and a protrusion. The adapter body comprises an upper portion, a lower portion, a radial inlet located in a sidewall of the adapter body between the upper and lower portions, and an adapter bore having a first diameter in fluid communication with the radial inlet. The head comprises a cavity in fluid communication with the adapter bore and having a second diameter larger than the first diameter, an adapter outlet located in the upper portion of the adapter body and in fluid communication with the cavity, and a handle extending radially from the head. The protrusion extends radially from the adapter body between the upper and lower portions of the adapter body.

19 Claims, 15 Drawing Sheets

Related U.S. Application Data

(60) Provisional application No. 62/181,948, filed on Jun. 19, 2015.

(51) Int. Cl.

| | |
|---|---|
| ***B05B 15/65*** | (2018.01) |
| ***B05C 17/03*** | (2006.01) |
| *B05C 17/02* | (2006.01) |

(52) U.S. Cl.
CPC .......... *B05C 17/03* (2013.01); *B05C 17/0316* (2013.01); *B05C 17/0235* (2013.01); *B05C 17/0308* (2013.01); *B05C 17/0325* (2013.01)

(58) Field of Classification Search
CPC .......... B05B 15/65–658; B05C 1/0813; B05C 17/03; B05C 17/0308; B05C 17/0316; B05C 17/0325; B05C 17/0333; B05C 17/0341
USPC ................. 239/391, 396, 397, 526–528, 600
See application file for complete search history.

(56) References Cited

U.S. PATENT DOCUMENTS

| | | | | |
|---|---|---|---|---|
| 4,013,225 | A | 3/1977 | Davis | |
| 4,108,382 | A * | 8/1978 | Ryd | B05B 15/652 427/236 |
| 4,111,368 | A | 9/1978 | Brehm | |
| 4,830,281 | A * | 5/1989 | Calder | B05B 1/16 137/329.01 |
| 5,094,402 | A | 3/1992 | Perret et al. | |
| 5,271,683 | A * | 12/1993 | Snetting | B05B 15/00 239/289 |
| 5,595,451 | A | 1/1997 | Harrison | |
| 5,765,758 | A | 6/1998 | Chu | |
| 5,829,905 | A | 11/1998 | Woodruff | |
| 5,842,638 | A | 12/1998 | Reents et al. | |
| 5,853,258 | A | 12/1998 | Woodruff | |
| 5,855,222 | A | 1/1999 | Jou | |
| 6,142,387 | A | 11/2000 | Jou | |
| 6,460,787 | B1 | 10/2002 | Hartle et al. | |
| 6,616,069 | B1 | 9/2003 | Jou | |
| 6,619,569 | B2 * | 9/2003 | Jens | B05B 15/652 239/581.1 |
| 7,922,105 | B2 | 4/2011 | Zagorsky | |
| 8,439,281 | B2 | 5/2013 | Troudt | |
| 2007/0122227 | A1 | 5/2007 | Davis | |
| 2007/0272707 | A1 | 11/2007 | Peralta et al. | |
| 2008/0247808 | A1 | 10/2008 | Costigan | |
| 2009/0302133 | A1 | 12/2009 | Micheli et al. | |
| 2011/0198413 | A1 | 8/2011 | Thompson et al. | |
| 2013/0119156 | A1 * | 5/2013 | Munn | B05B 7/26 137/315.01 |
| 2013/0233945 | A1 | 9/2013 | Andersen | |
| 2013/0277455 | A1 | 10/2013 | Thompson et al. | |

FOREIGN PATENT DOCUMENTS

| | | | |
|---|---|---|---|
| CN | 203417791 | U | 2/2014 |
| CN | 203494686 | U | 3/2014 |
| CN | 203508334 | U | 4/2014 |
| CN | 203678576 | U | 7/2014 |
| CN | 204074302 | U | 1/2015 |
| CN | 104607347 | A | 5/2015 |
| JP | 2003236430 | A | 8/2003 |
| WO | 2014043333 | A1 | 3/2014 |

OTHER PUBLICATIONS

Extended European Search Report for European Patent Application No. 16812624.1, dated Jan. 3, 2019, 8 pages.
International Preliminary Report on Patentability for PCT Application No. PCT/US2016/038377, dated Dec. 28, 2017, 8 pages.
International Search Report and Written Opinion from PCT Application Serial No. PCT/US2016/038377, dated Oct. 12, 2016, 12 pages.
Second Chinese Office Action for Chinese Patent Application No. 2016800306546, dated Oct. 14, 2019, 2 pages.

* cited by examiner

PRESSURE-FED ACCESSORIES ADAPTER FOR AN AIRLESS SPRAY GUN

CROSS-REFERENCE TO RELATED APPLICATION

This application is a continuation of U.S. application Ser. No. 15/571,142, filed Nov. 1, 2017, and entitled "PRESSURE-FED ACCESSORIES ADAPTER FOR AN AIRLESS SPRAY GUN," which is a National Stage Application of PCT Application No. PCT/US2016/038377, which claims priority to U.S. Provisional Application No. 62/181,948 filed on Jun. 19, 2015, and entitled "PRESSURE-FED ACCESSORIES ADAPTER FOR AIRLESS SPRAY EQUIPMENT," the entire contents of which are hereby incorporated by reference in their entirety.

BACKGROUND

The present invention is related to portable liquid dispensing systems. In particular, the present invention relates to portable paint sprayers. Paint sprayers are well known and popular for use in painting surfaces, such as on architectural structures, furniture and the like. Airless paint sprayers provide the highest quality finish amongst common sprayer system due to their ability to finely atomize liquid paint. In particular, airless paint sprayers pressurize liquid paint and discharge the paint through small, shaped orifices known as spray tips. The paint leaves the spray tip as an atomized spray having a shape referred to as a pattern. Once the paint has left the spray tip the paint coats a surface. The spray tips may be removed by hand and replaced with a different spray tip that provides a different pattern.

It is, however, often desirable to paint some areas using a different device, such as a paint roller. However, switching from an airless paint sprayer to a paint roller would require an operator to provide a tray or other container to hold paint in which the roller could be dipped. Alternatively, if the paint roller is pressure-fed, a paint supply system for feeding paint to the paint roller is needed. In either case, an operator is required to provide more equipment if the operator desires to apply paint by means other than the paint sprayer.

SUMMARY

In one embodiment, an apparatus supplies paint under pressure to a paint applicator. The apparatus comprises a handheld airless spray gun and a spray gun adapter. The handheld airless spray gun comprises a housing, a fluid pump having an outlet disposed within the housing, and a spray tip assembly fluidly connected to the outlet of the fluid pump and having a bore for receiving and holding a spray tip. The spray gun adapter is configured to be installed in the bore of the spray tip assembly. The spray gun adapter comprises an adapter body, an adapter bore, an adapter inlet, and an adapter outlet. The adapter body has a lower portion configured to fit in the spray tip bore of the spray tip assembly and an upper portion configured to extend out of the spray tip bore. The adapter bore extends into the adapter body from the upper portion toward the lower portion. The adapter inlet is in fluid communication with the adapter bore and located in a sidewall of the lower portion of the adapter body and positioned to be in fluid communication with the outlet of the fluid pump when the lower portion of the adapter body is located in the spray tip bore. The adapter outlet is in fluid communication with the adapter bore and located at the upper portion of the adapter.

In another embodiment, a spray gun adapter establishes fluid communication between a fluid pump of a handheld airless spray gun and an applicator accessory. The adapter comprises an adapter body, a head attached to the adapter body, and a protrusion. The adapter body comprises an upper portion, a cylindrical lower portion, a radial inlet located in a sidewall of the lower portion of the adapter body, and an adapter bore having a first diameter in fluid communication with the radial inlet. The head attached to the adapter body is attached at the upper portion of the adapter body. The head comprises an adapter outlet located in the upper portion of the adapter body and in fluid communication with the adapter bore and a handle extending from the upper portion of the adapter body. Fluid flowing from the adapter inlet to the adapter outlet makes a ninety degree turn after flowing through the adapter inlet to flow to the adapter inlet. The protrusion extends radially from the adapter body between the upper portion and the lower portion of the adapter body.

In a further embodiment, a method for dispensing fluid from an applicator accessory makes use of a handheld airless spray gun. The method comprises removing by hand a spray tip from a spray tip assembly connected to an outlet of a fluid pump within the handheld spray gun, installing a spray gun adapter in the spray tip assembly by hand so that the spray gun adapter is in fluid communication with the outlet of the fluid pump, connecting an accessory to the spray gun adapter, and dispensing fluid through the accessory using the handheld airless spray gun, wherein the spray gun adapter is configured to connect an accessory to the handheld airless spray gun to allow the handheld airless spray gun to dispense fluid through the accessory.

DETAILED DESCRIPTION

Figure 1:
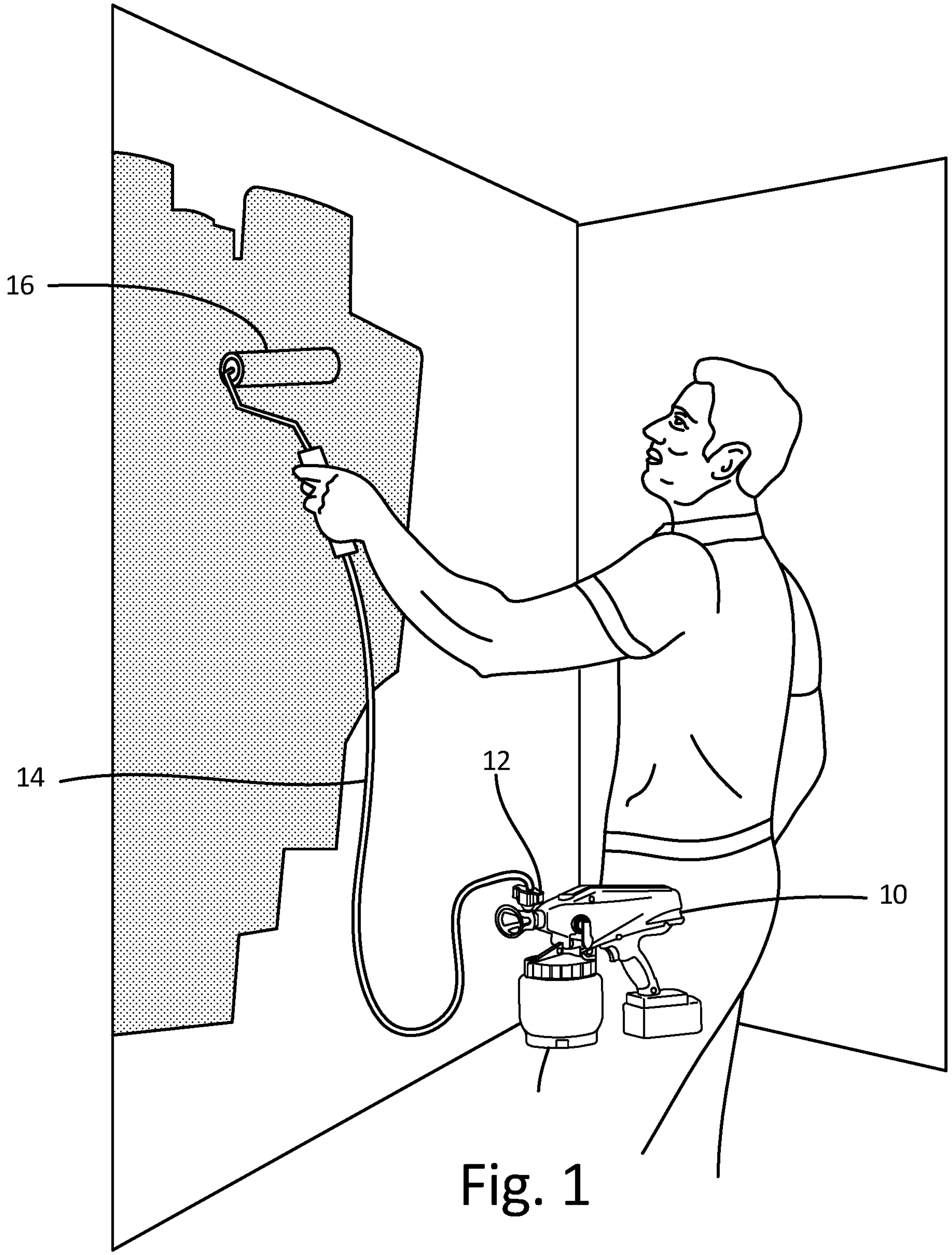
FIG. 1 is a perspective view of a handheld airless paint spray gun with a spray gun adapter installed being used to provide paint from the paint spray gun to a paint roller.

FIG. 1 shows a perspective view of a handheld airless spray gun 10, spray gun adapter 12, and tubing 14 being used to supply paint to pressure-fed paint roller 16. Spray gun adapter 12 is installed in spray gun 10, and tubing 14 connects spray gun adapter 12 to pressure-fed paint roller 16. This arrangement establishes fluid communication between spray gun 10 and pressure-fed paint roller 16.

Spray gun 10 is an airless sprayer used in conjunction with a spray tip to produce a spray pattern in order to apply paint to a surface such as a wall. When used for spraying, spray gun 10 uses a pump to draw paint from a container and provides the paint under pressure to a spray tip. The paint is atomized by an outlet in the spray tip and deposited on the surface being painted.

Spray gun 10 can be used to supply paint to a paint applicator accessory such as a pressure-fed paint pad or roller (such as pressure-fed paint roller 16). This is accomplished by replacing the spray tip of the spray gun 10 with spray gun adapter 12 and connecting tubing 14 between spray gun adapter 12 and an inlet of pressure-fed paint roller 16. Spray gun adapter 12 is installed in spray gun 10 in place of the spray tip. The pump of spray gun 10 draws paint from a fluid container and provides it, under pressure, to spray gun adapter 12. Spray gun adapter 12 directs the fluid through tubing 14 and to pressure-fed paint roller 16 or another accessory.

Spray gun adapter 12 allows an operator to use spray gun 10 to provide paint to an accessory such as pressure-fed paint roller 16. This allows an operator to apply paint by both spraying and rolling without having to provide additional equipment when the operator wants to apply paint using roller 16.

Figure 2:
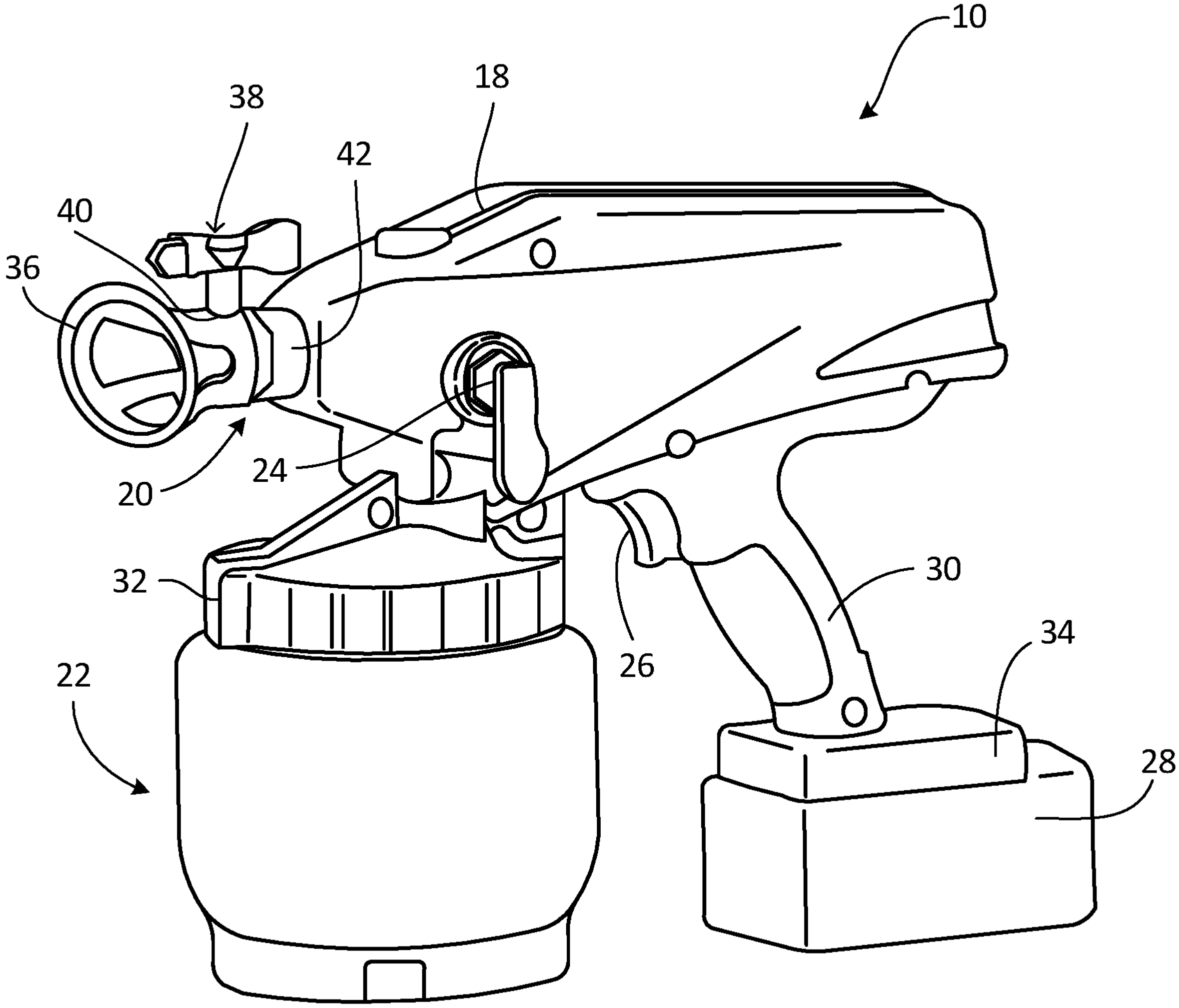
FIG. 2. is a perspective view of the paint spray gun of FIG. 1

FIG. 2 is a perspective view of spray gun 10. Spray gun 10 includes housing 18, spray tip assembly 20, fluid container 22, pressure relief valve 24, trigger 26, and battery 28. Housing 18 includes integrated handle 30, container lid 32, and battery port 34. Alternative embodiments may have a conventional electrical cord for supplying power to the spray gun 10. Spray tip assembly 20 includes guard 36, spray tip 38, bore 40, and threaded connection 42. Spray tip assembly 20 is connected to housing 18 by a cylindrical valve that extends through an opening of housing 18. Threaded connection 42 connects to one end of the cylindrical valve. The other end of the cylindrical valve is connected to a fluid pump disposed inside housing 18. This establishes fluid communication between the fluid pump and spray tip assembly 20. Spray tip 38 is installed in bore 40 of spray tip assembly 20. A lower portion of the spray tip 38 is a cylinder while the bore 40 is a cylindrical cavity that accepts the lower portion of the spray tip 38 with a circumferential interference fit between the outer circumference of the lower portion of the spray tip 38 and the inner circumference of the bore 40. Spray tip 38 has an inlet and an outlet in fluid communication with threaded connection 42. This allows fluid to be dispensed from the fluid pump disposed inside housing 18 through spray tip 38. The outlet of spray tip 38 is shaped so that fluid passing through the outlet is atomized and leaves spray tip 38 in a particular pattern.

Fluid container 22 is connected to housing 18 by container lid 32. Container lid 32 has threads that complement threads on fluid container 22 so that fluid container 22 can be connected to housing 18. Pressure relief valve 24 extends through an opening in a side of housing 18 and connects to the fluid pump disposed in housing 18. Opening pressure relief valve 24 allows pressure in spray gun 10 to be released to the atmosphere. Trigger 26 extends from integrated handle 30 of housing 18 and is connected to a switch disposed within housing 18. Battery 28 is connected to battery port 34.

When trigger 26 is depressed the switch disposed in housing 18 establishes an electrical connection between battery 28 and a drive element disposed within housing 18. The drive element includes an electric motor that drives the fluid pump disposed within housing 18. The fluid pump draws paint from fluid container 22 and pumps it to spray tip 38 where the paint is atomized. The spray gun 10 or other spray gun referenced herein can be configured in any manner or include any feature disclosed in U.S. Pat. No. 8,596,555, the entirety of which is hereby incorporated by reference.

Figure 3:
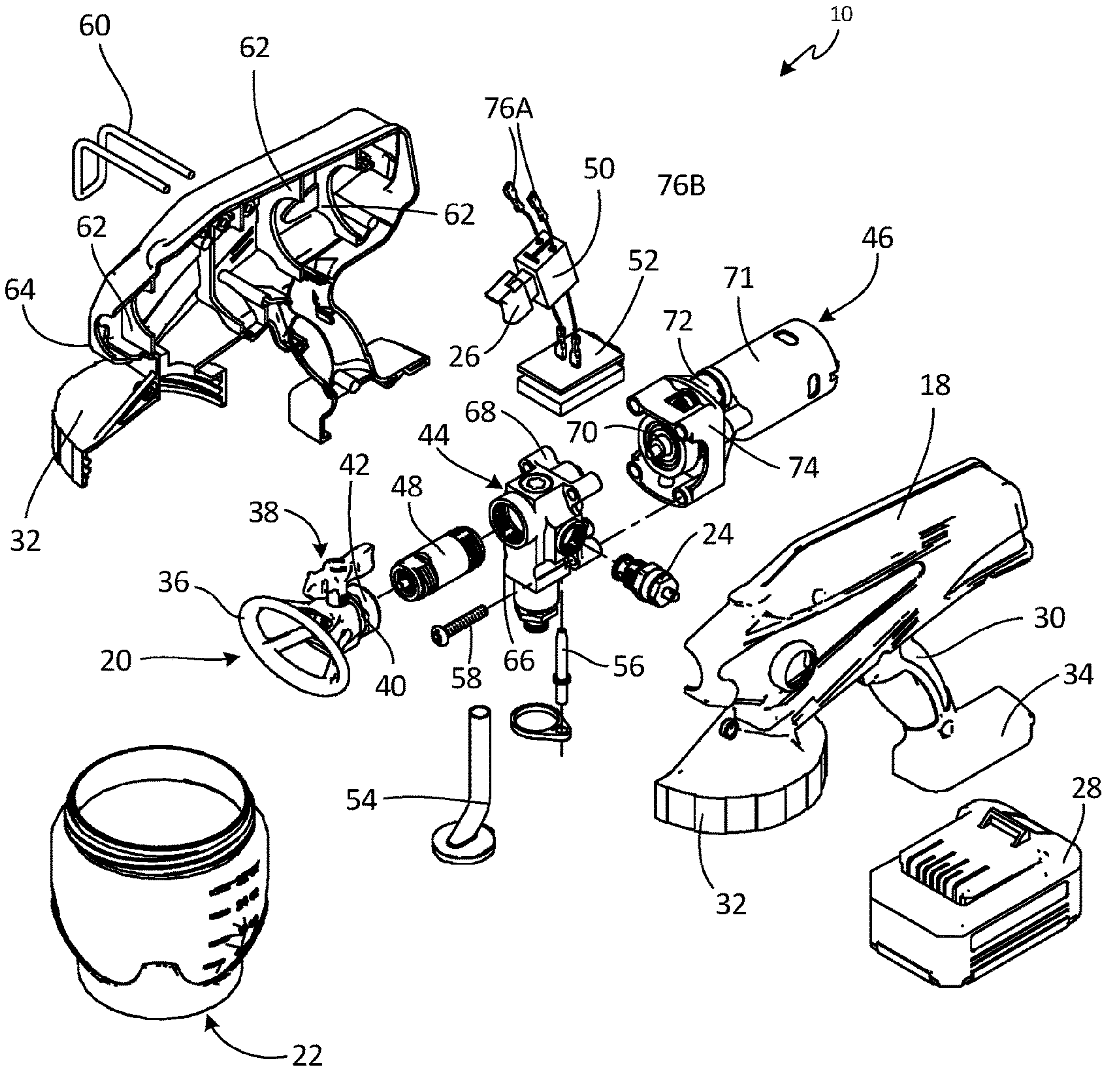
FIG. 3 is an exploded view of the paint spray gun of FIG. 1.

FIG. 3 is an exploded view of spray gun 10. Spray gun 10 includes housing 18, spray tip assembly 20, fluid container 22, fluid pump 44, drive element 46, pressure relief valve 24, trigger 26, battery 28, cylindrical valve 48, switch 50, circuit board 52, suction tube 54, return line 56, fastener 58, and clip 60.

Housing 18 includes integrated handle 30, container lid 32, battery port 34, ribs 62, and housing opening 64. Spray tip assembly 20 includes guard 36, spray tip 38, bore 40, and threaded connection 42. Fluid pump 44 includes threaded outlet 66 and bracket 68. Drive element 46 includes gearing 70, motor 71, and connection assembly 72. Switch 50 includes terminals 76A and 76B. Connection assembly 72 includes bracket 74.

Spray tip assembly 20 is connected to housing 18 by threaded connection 42 which connects to one end of cylindrical valve 48 which is threaded at both ends. Cylindrical valve 48 extends through housing opening 64 of housing 18 and connects to threaded outlet 66 of fluid pump 44. This establishes fluid communication between spray tip assembly 20 and fluid pump 44. Fluid container 22 is threaded and is connected to housing 18 by container lid 32 which is also threaded. Suction tube 54 is connected to fluid pump 44 and is positioned within fluid container 22 when fluid container 22 is connected to container lid 32. Return line 56 is connected to fluid pump 44 and is also disposed within fluid container 22 when fluid container 22 is connected to container lid 32.

Fluid pump 44 and drive element 46 are disposed within housing 18 and are supported by ribs 62. Drive element 46 is connected to fluid pump 44 by bracket 74 of connection assembly 72. Bracket 74 is connected to bracket 68 of fluid pump 44 by fastener 58. Motor 71 of drive element 46 rotates gearing 70. Gearing 70 of drive element 20 is connected to fluid pump 44 by a shaft. The shaft transfers power from gearing 70 of drive element 20 to drive fluid pump 44. This arrangement allows motor 71 to drive fluid pump 44. Pressure relief valve 24 is connected to fluid pump 44 and extends through a side opening in housing 18.

Trigger 26 is positioned in housing 18 so that it extends out of integrated handle 30. Trigger 26 is connected to switch 50 which is disposed within housing 18. Switch 50 is connected to drive element 46 by terminals 76A and connected to circuit board 52 by terminals 76B. Circuit board 52 is disposed inside housing 18 and is in contact with battery 28 which is connected to housing 18 at battery port 34. This arrangement allows electrical current to be supplied from battery 28 to drive element 46 to drive motor 71.

Guard 36 has an oval opening and is connected to spray tip assembly 20. Spray tip 38 is installed in bore 40 of spray tip assembly 20 and has an inlet and an outlet. Bore 40 is in fluid communication with threaded connection 42 and cylindrical valve 48. The inlet of spray tip 38 is in fluid communication with the outlet of spray tip 38. The outlet of spray tip 38 is positioned so that paint exiting the outlet of spray tip 38 passes through the circular opening of guard 36. In this manner, the paint is sprayed in a forward direction, with respect to the spray gun 10 and user, directly from the spray tip 38 while the spray tip 38 resides within the bore 40 of the spray gun 10. Clip 60 is connected to housing 18 and allows an operator to clip spray gun 10 to a belt.

When an operator is spraying a surface with handheld airless sprayer 10, the operator depresses trigger 26. The depression of trigger 26 allows current to flow from battery 26 through circuit board 52 to switch 50 and to drive element 46 through terminals 76A and 76B. The current powers motor 71 of drive element 46 which rotates gearing 70. Gearing 70 drives fluid pump 44 through a shaft connected to gearing 70 and fluid pump 44. Fluid pump 44 draws paint from fluid container 22 through suction tube 54 and provides the paint to cylindrical valve 48. Once a high enough pressure is reached, cylindrical valve 48 opens and paint passes through cylindrical valve 48 to threaded connection 42 of spray tip assembly 20. Paint then flows through spray tip assembly 20 to bore 40 where spray tip 38 is installed. Paint then flows from an inlet in spray tip 38 to an outlet in spray tip 38. The outlet of spray tip 38 is shaped so that the paint is atomized as it passes through the outlet. The paint leaves the outlet of spray tip 36 and passes through the circular opening of guard 36 and coats a surface as a spray. Pressure relief valve 24 can be opened. Opening pressure relief valve 24 connects fluid pump 44 to the atmosphere and releases pressure from fluid pump 44. Any fluid in fluid pump 44 that has not been sprayed may return to fluid container 22 through return line 56.

FIGS. 2-3 and the discussion above explain how spray gun 10 is used to spray fluid through spray tip 38. However, spray gun 10 can also be used to provide fluid to an accessory such as pressure-fed paint roller 16 (shown in FIG. 1) by removing spray tip 38 from spray tip assembly 20 and installing a spray gun adapter in its place.

Spray gun 10 of FIGS. 1-3 is provided as an example of an airless spray gun in which spray gun adapter 12 is used. However, a spray gun adapter, such as spray gun adapter 12 may be used in any model of a spray gun that is capable of having a spray gun adapter installed in place of a spray tip. Other models of spray guns may include, but are not limited to corded spray guns, spray guns capable of having paint cans or other containers attached directly to the spray gun housing, and spray guns activated by remote so that a user does not need to hold the sprayer when utilizing an attached applicator accessory.

Figure 4:
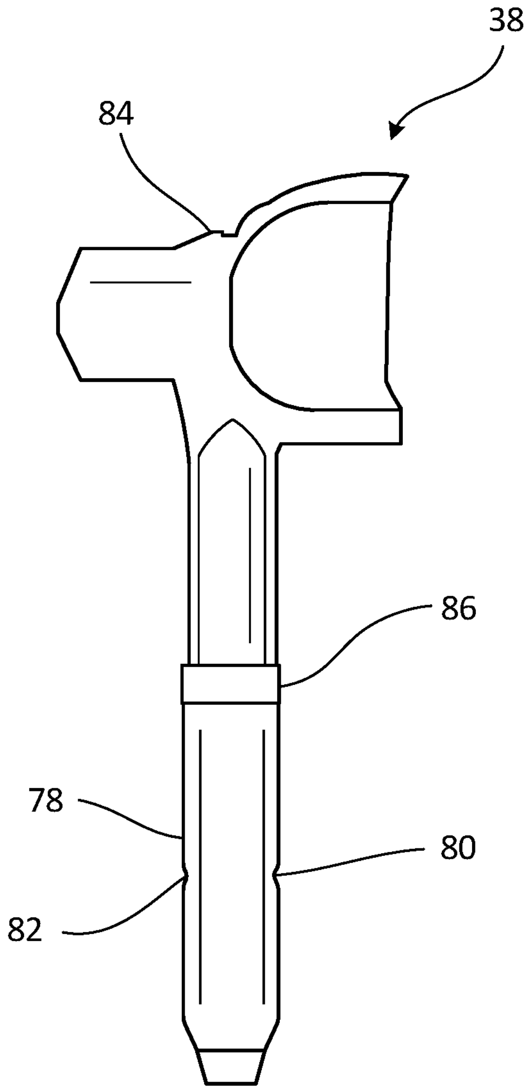
FIG. 4 is a side view of a spray tip of FIG. 2 removed from a spray tip assembly shown in FIG. 2.

FIG. 4 is a side view of spray tip 38. Spray tip 38 has barrel 78, spray tip inlet 80, spray tip outlet 82, spray tip handle 84. Spray tip handle 84 has spray tip protrusion 86. Spray tip inlet 80 extends through a sidewall of barrel 78 and connects to spray tip outlet 82 which also extends through a sidewall of barrel 78 so that spray tip inlet 80 and spray tip outlet 82 are in fluid communication with each other through a passageway that extends through the barrel 78. Spray tip inlet 80 and spray tip outlet 82 are positioned so that they align with threaded outlet 66 of fluid pump 44. This alignment allows fluid to flow from fluid pump 44 (shown in FIG. 3) to spray tip outlet 82 of spray tip 38. Spray tip outlet 82 is shaped so that fluid passing through spray tip outlet 82 is atomized. The shape of spray tip outlet 82 also creates a desired spray pattern. Spray tip handle 84 is connected to the top of barrel 78 and allows a user to easily rotate spray tip 38. Rotation of spray tip 38 is used during installation and removal of spray tip 38 from spray tip assembly 20 (shown in FIG. 2) or to reverse the direction of flow within the spray tip 38 to remove clogs. Spray tip protrusion 86 extends radially (out of the plane of FIG. 4 toward the viewer) from spray tip handle 84 and is positioned between the ends of barrel 78. Spray tip 38 may be inserted into spray tip assembly 20. Once inserted into spray tip assembly 20, spray tip 38 may be rotated ninety degrees so that spray tip protrusion 86 fits into a recess of spray tip assembly 20. This relationship between spray tip protrusion 86 and the recess of spray tip assembly 20 prevents spray tip 38 from being accidentally removed from spray tip assembly 20. Barrel 78 is sized so that barrel 78 may be inserted into a bore of spray tip assembly 20. Spray tip 38 may easily be inserted into and removed from spray tip assembly 20.

Figure 5C:
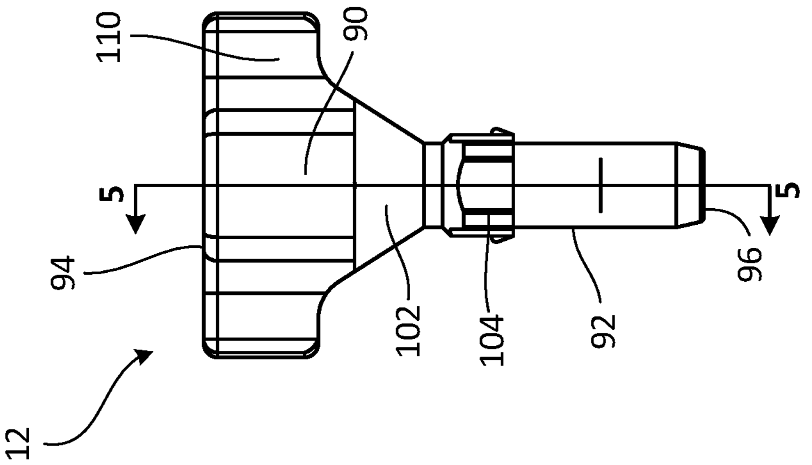
FIG. 5C is a side view of the spray gun adapter of FIGS. 5A and 5B.
Figure 5B:
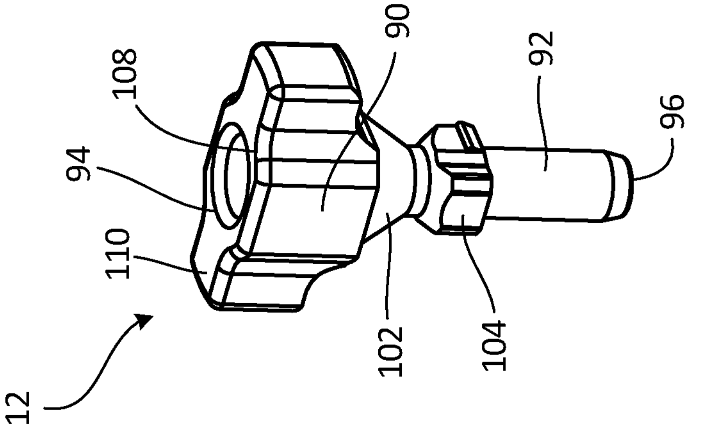
FIG. 5B is a perspective view of the spray gun adapter of FIG. 5A showing the opposite side of the spray gun adapter.
Figure 5A:
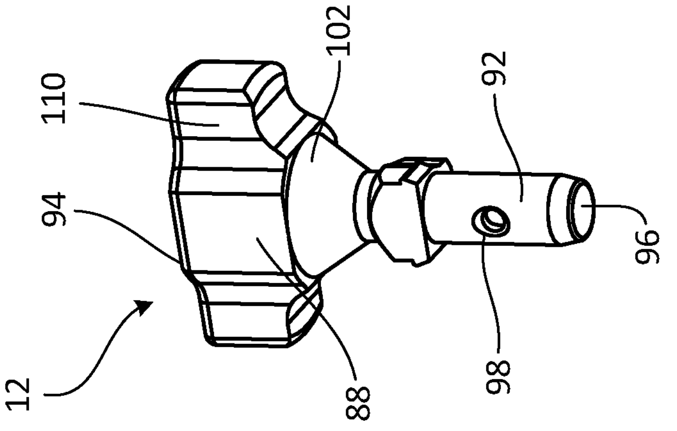
FIG. 5A is a perspective view of the spray gun adapter of FIG. 1 that can be installed in place of a spray tip in a spray tip assembly of the paint spray gun of FIG. 2.
Figure 5D:
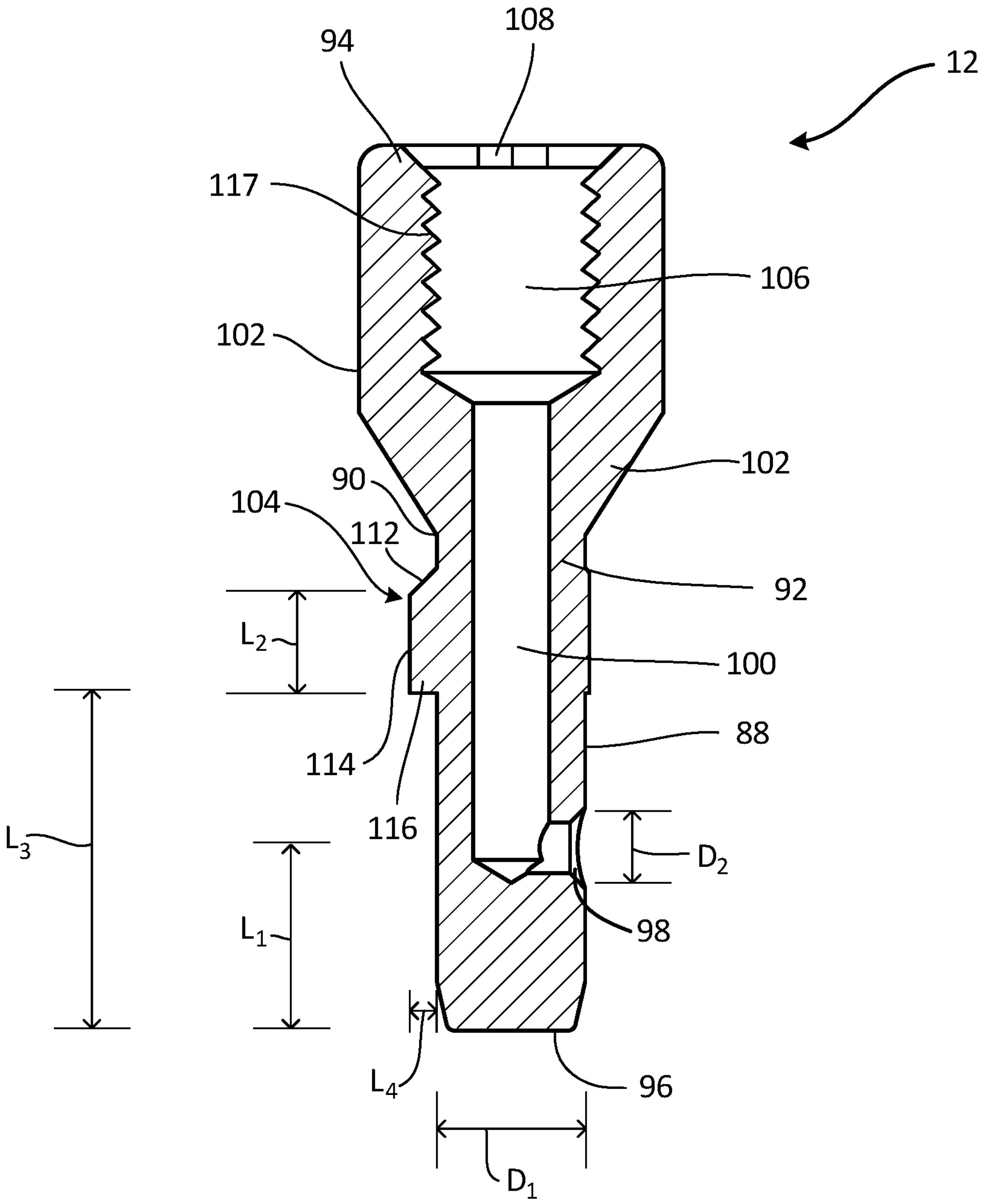
FIG. 5D is a cross-sectional view of the spray gun adapter of FIGS. 5A-5C taken along line 5-5 of FIG. 5C.

FIGS. 5A-5D show spray gun adapter 12, which can replace spray tip 38 to allow spray gun 10 to supply paint to an accessory such as pressure-fed paint roller 16. FIG. 5A is a perspective view of first side 88 of spray gun adapter 12. FIG. 5B is a perspective view of second side 90 of spray gun adapter 12 of FIG. 5A. The first side 88 is opposite the second side 90. FIG. 5C is a side view of spray gun adapter 12. FIG. 5D is a cross-sectional view of spray gun adapter 12 taken along line 5-5 of FIG. 5C. FIGS. 5A-5D will be discussed together in the following description. Spray gun adapter 12 has first side 88, second side 90, and adapter body 92. Adapter body 92 has upper portion 94, lower portion 96, adapter inlet 98, adapter bore 100, head 102, adapter protrusion 104, and diameter D1. Adapter inlet 98 has diameter D2. Head 102 has cavity 106, adapter outlet 108, and adapter handle 110. Adapter protrusion 104 has angled surface 112, axial surface 114, and radial surface 116. Cavity 106 has cavity threads 117.

Adapter body 92 has diameter $D_1$. In various embodiments, diameter $D_1$ is greater than or equal to 0.921 centimeters (0.363 inches) and less than or equal to 0.933 (0.367 inches), however not all embodiments may be so limited. This size of diameter $D_1$ allows adapter body 92 to be inserted into bore 40 of spray tip assembly 20. Adapter inlet 98 is located between upper portion 94 and lower portion 96 of adapter body 92. Adapter inlet 98 is a circular bore that extends radially through adapter body 92 and intersects adapter bore 100 so that adapter inlet 98 is in fluid communication with adapter bore 100. Adapter inlet 98 has a diameter $D_2$. Diameter $D_2$ is 0.508 centimeters (0.2 inches) in various embodiments, however other diameters can be realized. This diameter ensures that adapter inlet 98 aligns with a seal installed in spray tip assembly 20 while still allowing adequate paint flow through inlet 98. The radial center of adapter inlet 98 is located a distance $L_1$ that extends from lower portion 96 toward upper portion 94 of adapter body 92. Distance $L_1$ is 1.143 centimeters (0.450 inches) in various embodiments, however other lengths can be realized. Having adapter inlet 98 located a distance $L_1$ away from lower portion 96 ensures that adapter inlet 98 is aligned with threaded outlet 66 of fluid pump 44. This alignment establishes fluid communication between threaded outlet 66 and adapter inlet 98.

Adapter bore 100 extends axially through adapter body 92 and extends from a point above lower portion 96 toward upper portion 94 of adapter body 92. Head 102 is connected to adapter body 98. Adapter protrusion 104 is connected to adapter body 92 and located between upper portion 94 and lower portion 96 of adapter body 92. Adapter protrusion 104 is also located below head 102 and is connected to adapter body 92.

Cavity 106 extends through head 102 to connect to adapter bore 100 to establish fluid communication between adapter bore 100 and head 102. Cavity 106 has cavity threads 117 to accept a threaded coupler of tubing 14 for connecting spray gun adapter 12 to tubing 14. Threading or other coupling means may alternatively be on the outside of the spray gun adapter 12 and tubing 14 (or a connector on the upstream end of the tubing 14) may fit around the threading or other coupling means of the spray gun adapter 12. In various embodiments, a non-threaded type of connection may be used to couple tubing 14 and spray gun adapter 12. Adapter outlet 108 is an axial outlet that extends through upper portion 94 of adapter body 92 and connects to cavity 106 so that adapter outlet 108 is in fluid communication with cavity 106. Adapter handle 110 extends from adapter body 92 above adapter protrusion 104.

Angled surface 112 of adapter protrusion 104 extends radially from and axially along adapter body 92. Angled surface 112 connects to axial surface 114 of adapter protrusion 104. Axial surface 114 extends axially along a distance $L_2$. Distance $L_2$ is 0.782 centimeters (0.308 inches) in various embodiments, however other lengths can be realized. Axial surface 114 connects to radial surface 116. Radial surface 116 extends radially from adapter body 92 to connect to axial surface 114. Radial surface 116 is located a distance $L_3$ above lower portion 96 of adapter body 92. Distance $L_3$ is greater than or equal to 2.103 centimeters (0.828 inches) and less than or equal to 2.118 centimeters (0.834 inches) in various embodiments, however other lengths can be realized. Radial surface 116 projects radially outward a distance $L_4$ from the cylindrical portion of the adapter body 92. Distance $L_4$ is greater than or equal to 0.162 centimeters (0.064 inches) and less than or equal to 0.175 centimeters (0.069 inches) in various embodiments, however other lengths can be realized. This length of radial surface 116 ensures that adapter protrusion 104 establishes a friction fit inside bore 40 of spray tip assembly 20. This prevents inadvertent removal of spray gun adapter 12.

Spray gun adapter 12 may be installed in bore 40 (shown in FIG. 2) of spray tip assembly 20 (shown in FIG. 2) by hand, meaning without tools. The adapter body 92 is cylindrical while the bore 40 into which the adapter body 92 is inserted is a cylindrical cavity that accepts the adapter body 92. Adapter inlet 98 is positioned between upper portion 94 and lower portion 96 so that it is aligned with threaded outlet 66 (shown in FIG. 3) of fluid pump 44 (shown in FIG. 3). This alignment establishes fluid communication between adapter inlet 98 and fluid pump 44. When spray gun adapter 12 is installed in spray tip assembly 20, fluid may flow from fluid pump 44 to adapter outlet 102. Adapter inlet 98 and adapter outlet 108 are the only openings in spray gun adapter 80. Thus, fluid does not spray out from the circular opening of guard 36 when spray gun adapter 12 is installed in spray tip assembly 20. Rather, fluid flows through adapter inlet 98 to adapter outlet 108.

A threaded coupler can be inserted into spray gun adapter 12 through adapter outlet 108. Tubing 14 connected to an accessory may then be pushed down over the coupler to establish a flow path between fluid pump 44 and an accessory such as pressure-fed paint roller 16 (shown in FIG. 1). A clamp may be placed on the end of tubing 14 to hold tubing 14 on the coupler. Spray tip assembly 20 and spray gun adapter 12 provide an operator of spray gun 10 with a way to easily connect spray gun 10 (shown in FIG. 1) to an accessory. This allows an operator to use spray gun 10 to provide paint to an accessory paint applicator. Spray gun adapter 12 may be installed by hand, meaning without tools. This makes the transition from spraying fluid using spray gun 10 to applying fluid using an accessory such as pressure-fed paint roller 16 simpler and less time consuming than a device that requires tools to install.

Figure 6A:
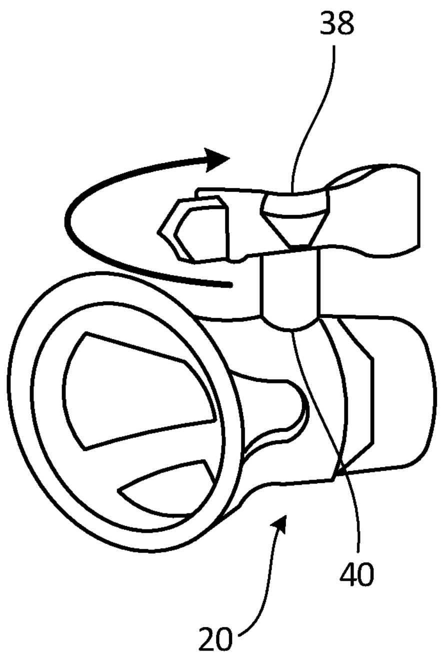
FIG. 6A is a perspective view of the spray tip assembly of FIG. 2 with a spray tip installed.
Figure 6B:
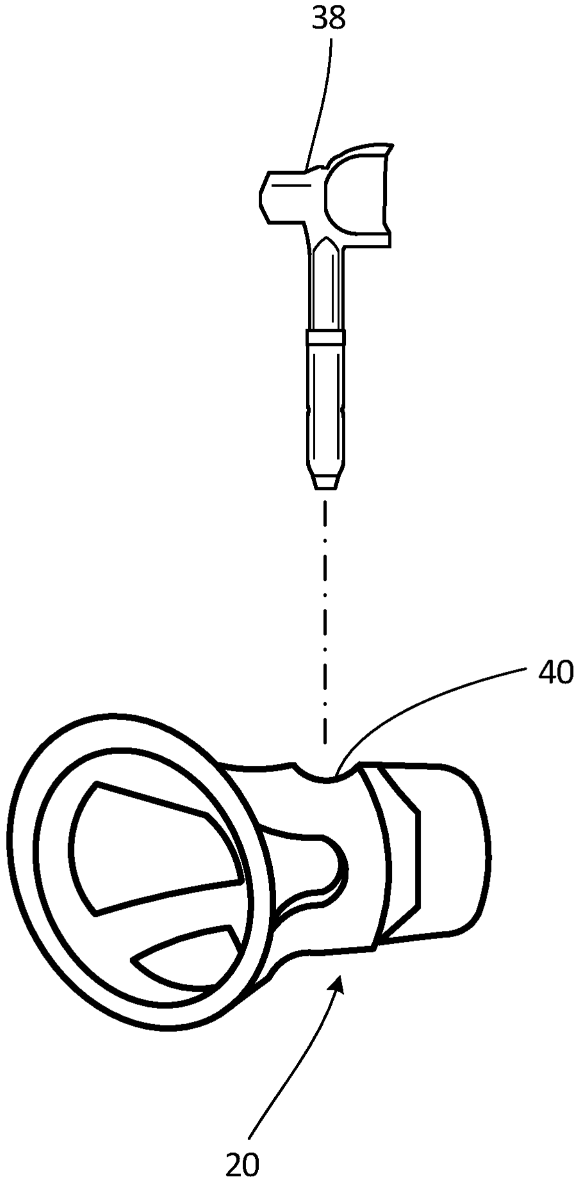
FIG. 6B is a perspective view of the spray tip assembly of FIG. 2 with the spray tip removed.
Figure 6C:
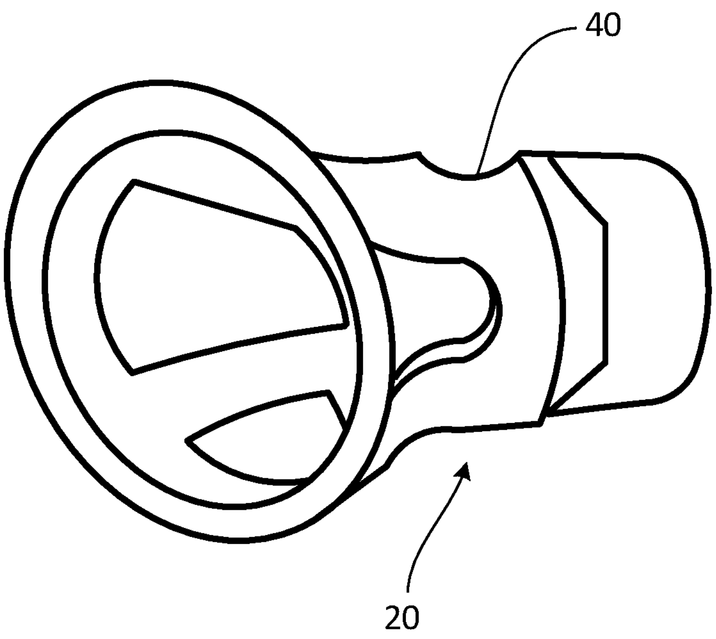
FIG. 6C is a perspective view of the spray tip assembly of FIG. 2 without the spray tip of FIG. 6B.

FIGS. 6A, 6B, and 6C demonstrate how spray tip 38 can be removed from spray tip assembly 20. FIG. 6A is a perspective view of spray tip assembly 20 with spray tip 38 installed in bore 40 of spray tip assembly 20. FIG. 6B is a perspective view of spray tip assembly 20 with spray tip 38 removed. FIG. 6C is a perspective view of spray tip assembly 20 with spray tip 38 removed. FIG. 6A demonstrates that one step for removing spray tip 38 from spray tip assembly 20 is rotating spray tip 38 by ninety degrees. This rotation moves spray tip protrusion 86 (shown in FIG. 4) out from a recess in spray tip assembly 20 so that spray tip 38 may be removed from spray tip assembly 20. Once spray tip 38 has been rotated ninety degrees, spray tip 38 is removed from spray tip assembly 20 by pulling spray tip 38 vertically out of spray tip assembly 20. FIG. 6B shows spray tip 38 separated from spray tip assembly 20 by being lifted out from the bore 40. FIG. 6C shows spray tip assembly 20 with spray tip 38 removed. Once spray tip 38 is removed from spray tip assembly 20, an operator can install spray gun adapter 12 within the bore 40.

Figure 7A:
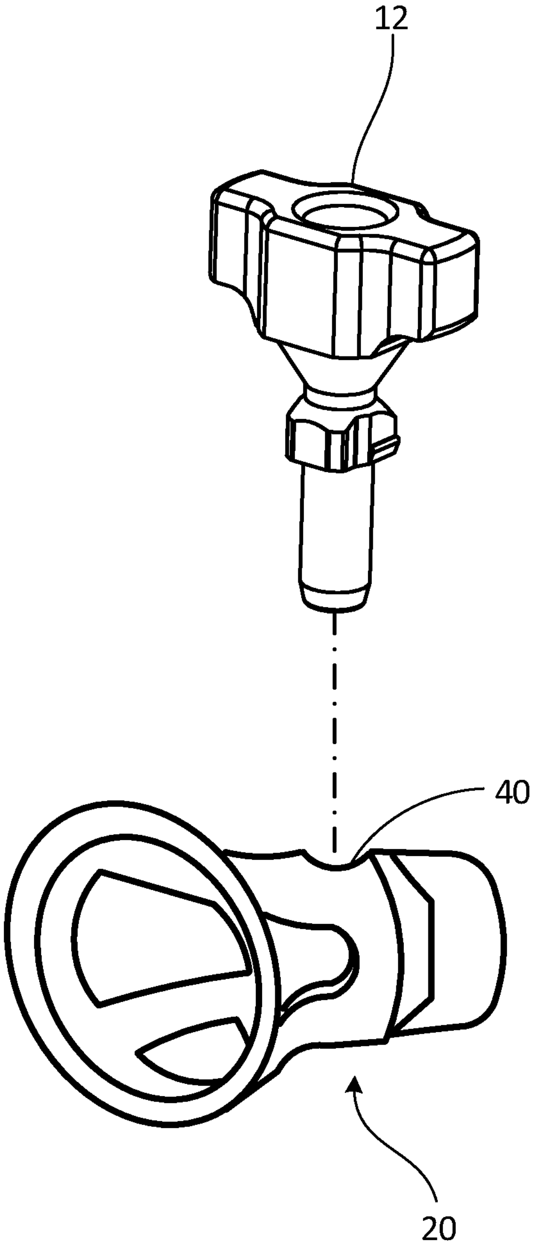
FIG. 7A is a perspective view of the spray tip assembly of FIG. 2 with the spray gun adapter of FIGS. 5A-5D about to be installed.
Figure 7B:
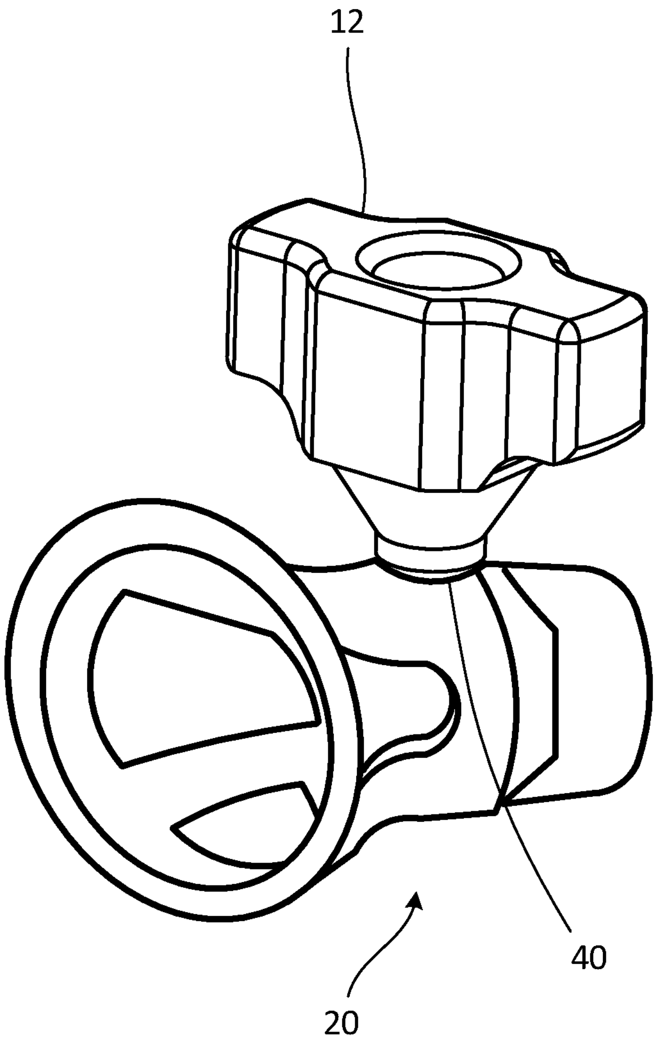
FIG. 7B is a perspective view of the spray gun adapter of FIGS. 5A-5D installed in the spray tip assembly of FIG. 2.

FIGS. 7A and 7B demonstrate how spray gun adapter 12 can be installed in spray tip assembly 20. FIG. 7A shows a perspective view of spray gun adapter 12 about to be installed in spray tip assembly 20. Spray tip assembly 20 has bore 40 which receives spray gun adapter 12. FIG. 7B is a perspective view of spray gun adapter 12 installed in bore 40 of spray tip assembly 20. Spray gun adapter 12 may be inserted into bore 40 of spray tip assembly 20.

Figure 8:
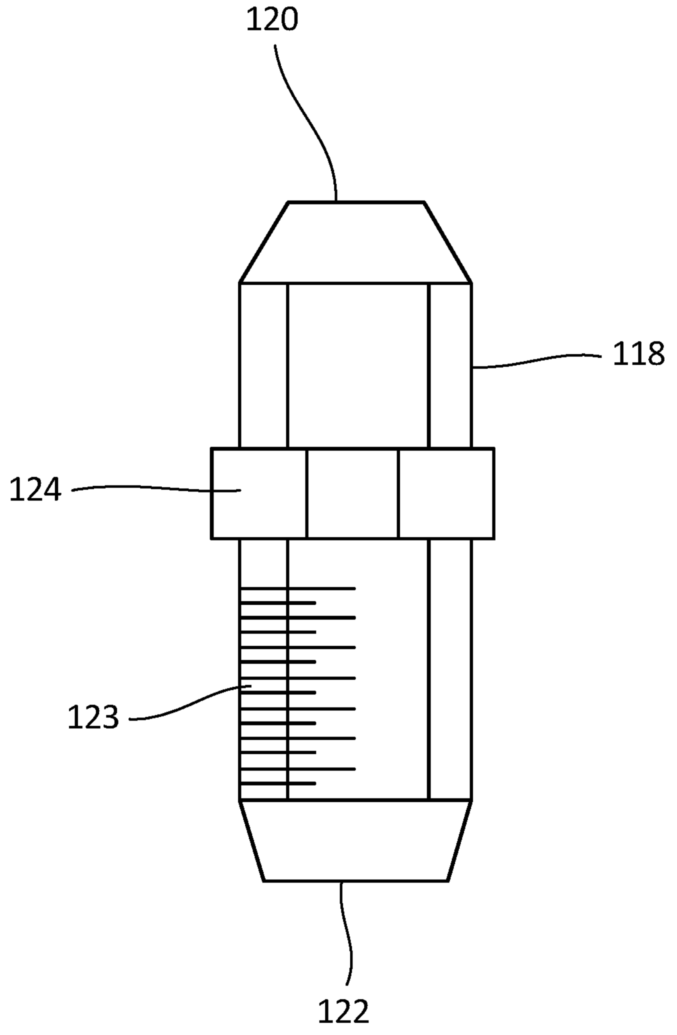
FIG. 8 is a side view of a coupler that can be installed in spray gun adapter of FIGS. 5A-5D.

FIG. 8 is a side view of threaded coupler 118. Threaded coupler 118 has first end 120, second end 122, threads 123, and nut 124. Threaded coupler 118 has a cylindrical shape, is hollow and is open at both first end 120 and second end 122. Threaded coupler 118 may be inserted into adapter outlet 108 (shown in FIG. 5D) and threaded into cavity 106 (shown in FIG. 5D) with cavity threads 117 (shown in FIG. 5D) of spray gun adapter 12 (shown in FIG. 5D). Nut 124 surrounds threaded coupler 118 and helps to prevent leaks from fluid outlet 108 of spray gun adapter 12 (shown in FIG. 1). Threaded coupler 118 allows tubing 14 (shown in FIG. 1) to be connected to spray gun adapter 12. This establishes a flow path between coupler 112 and pressure-fed paint roller 16 or another accessory. Spray gun 10 (shown in FIG. 1) may be used to provide paint to an accessory such as pressure-fed paint roller 16 (shown in FIG. 1), when coupler 118 is installed in spray gun adapter 12 (shown in FIG. 1) and connected to tubing 14 (shown in FIG. 1), spray gun adapter 12 is installed in spray tip assembly 20 (shown in FIG. 1), and tubing 14 is connected to pressure-fed paint roller 16. This arrangement establishes a flow path between spray gun 10 and pressure-fed paint roller 16 or another accessory.

Figure 9:
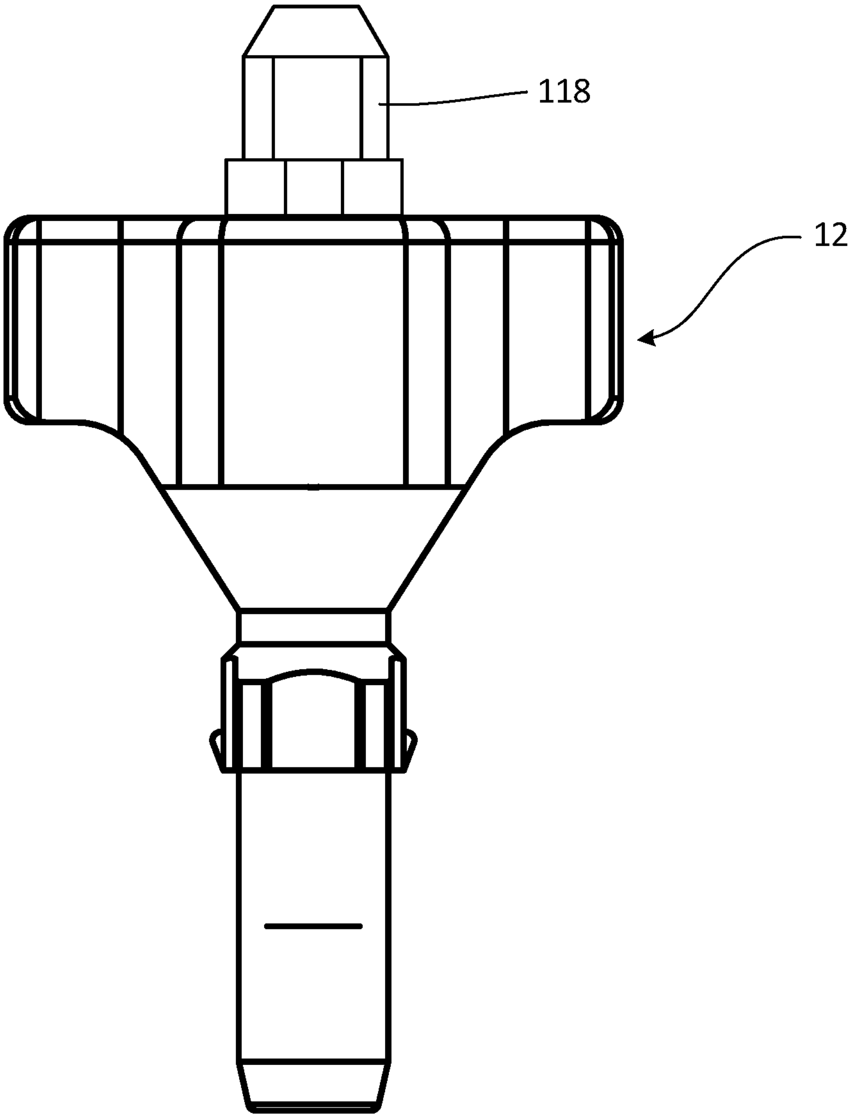
FIG. 9 is a side view of the spray gun adapter of FIGS. 5A-5D with the coupler of FIG. 8 installed in the spray gun adapter.

FIG. 9 is a side view of spray gun adapter 12 with threaded coupler 118 installed. Threaded coupler 118 may be installed in spray gun adapter 12 by being inserted into adapter outlet 108 (shown in FIG. 5D). Threaded coupler 118 is a hollow cylinder open at both ends. This allows tubing 14 to be connected to spray gun adapter 12 by being pushed down over coupler 112 establishing a flow path between an accessory connected to tubing 14 and threaded coupler 118. Spray gun 10 (shown in FIG. 1) may be used to provide paint to an accessory such as pressure-fed paint roller 16 (shown in FIG. 1), when threaded coupler 118 is installed in spray gun adapter 12 and connected to tubing 14 (shown in FIG. 1), spray gun adapter 12 is installed in spray tip assembly 20 (shown in FIG. 2), and tubing 14 is connected to pressure-fed paint roller 16 (shown in FIG. 1). This arrangement establishes a flow path between spray gun 10 and pressure-fed paint roller 16 or another accessory.

Figure 10:
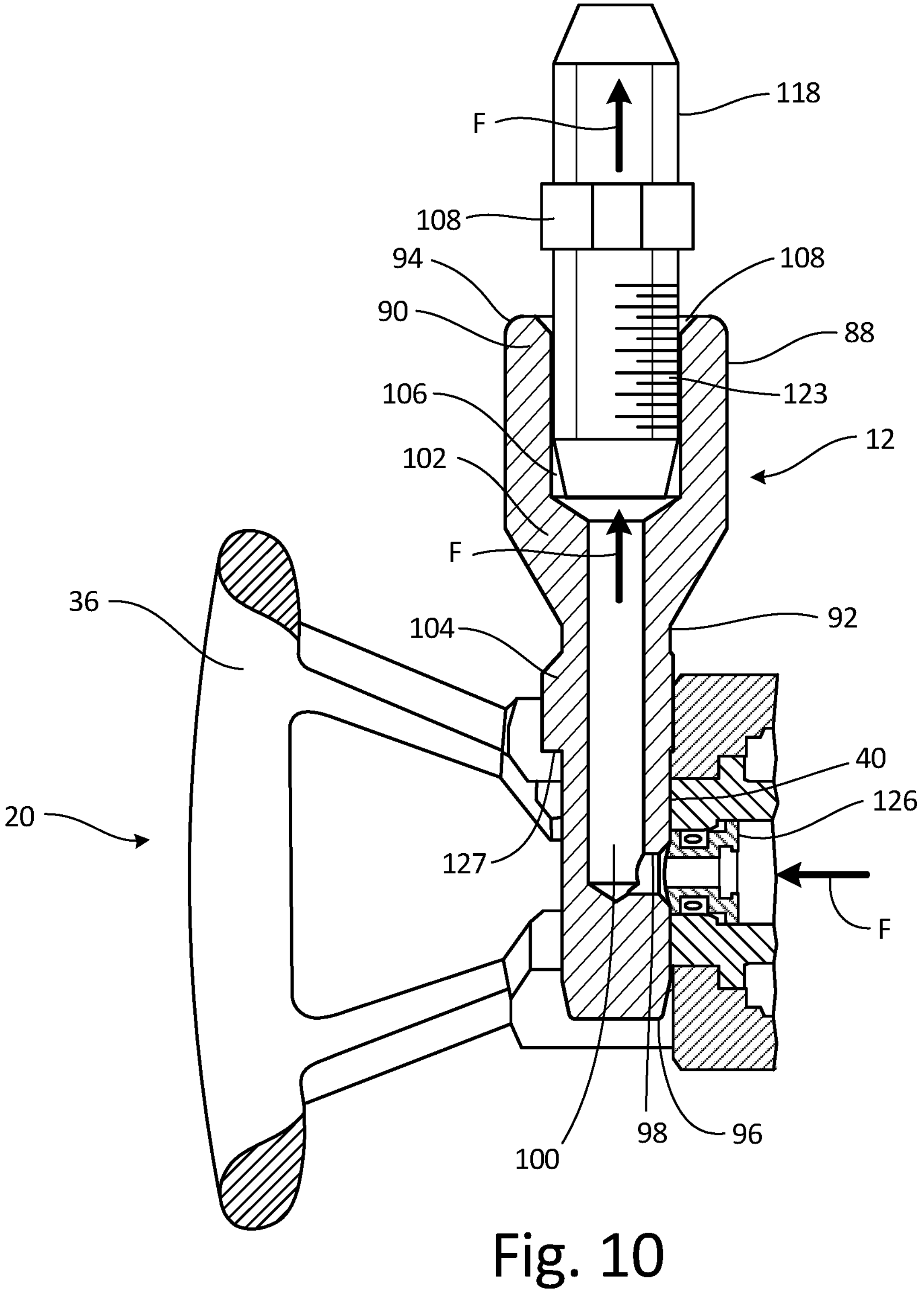
FIG. 10 is a cutaway view of the spray tip assembly of FIG. 2 with the spray gun adapter of FIGS. 5A-5D and the coupler of FIG. 8 installed.

FIG. 10 is a cutaway view of spray tip assembly 20 with spray gun adapter 12 installed and threaded coupler 118 installed in spray gun adapter 12. Spray tip assembly 20 has seal 126 and shoulder 127. Threaded coupler 118 is installed in adapter outlet 108 and threaded into cavity 106 using cavity threads 117 and threads 123 of coupler 118. Seal 126 is positioned so that seal 126 forms a seal around adapter inlet 98. Flow lines F show how paint moves through seal 126, into adapter inlet 98, into adapter bore 100, to head 102, into cavity 106 and through outlet 108 through threaded coupler 112. Protrusion 104 of spray gun adapter 12 is positioned on shoulder 127 of spray gun assembly 20. This ensures that adapter inlet 98 is vertically aligned with seal 126 and outlet 66 of fluid pump 44. Furthermore, protrusion 104 being positioned on shoulder 127 prevents rotation of spray gun adapter 12. This ensures that adapter inlet 98 is not rotated out of alignment with seal 126 and adapter inlet 98. Spray gun adapter 12 and coupler 118 provide a means for connecting spray gun 10 (shown in FIG. 1) to an accessory such as pressure-fed paint roller 16 (shown in FIG. 1) so that spray gun 10 can be used to provide paint to an accessory.

Figure 11:
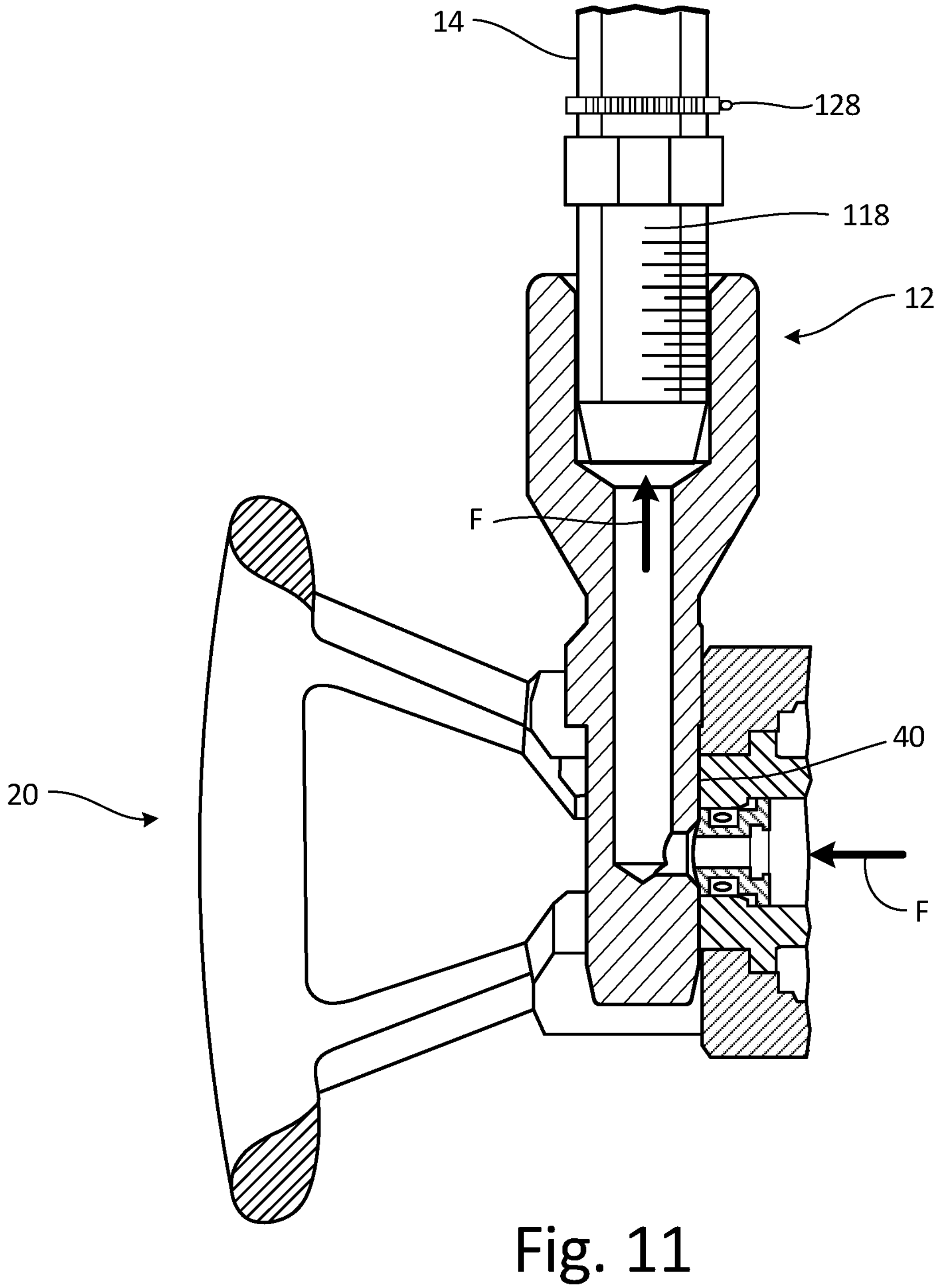
FIG. 11 is a cutaway view of spray tip assembly of FIG. 2 with the spray gun adapter of FIGS. 5A-5D installed and connected to the tubing of FIG. 1 by the coupler of FIG. 7.

FIG. 11 is a cutaway view of spray gun adapter 12, connected to tubing 14, and installed in spray tip assembly 20. Threaded coupler 118 is used to connect spray gun adapter 12 to tubing 14. Tubing 14 has clamp 128 installed on an end of tubing 14. When coupler 118 is installed in spray gun adapter 12, tubing 14 may be pushed down over coupler 118 to establish fluid communication between spray gun 10 (shown in FIG. 1), tubing 14, and an accessory connected to tubing 14 such as pressure-fed paint roller 16 (shown in FIG. 1). This arrangement allows an operator to use spray gun 10 to provide paint to an accessory such as pressure-fed paint roller 16 (shown in FIG. 1). This prevents an operator from having to provide additional equipment such as a paint tray for dipping a paint roller.

It is noted that the spray tip 38 routes paint straight through the spray tip assembly 20 to spray atomized paint from the front of the spray gun 10. The spray gun adapter 12, when placed in the spray tip assembly 20 in place of the spray tip 38, redirects the flow of the paint to make a ninety degree, upwards turn out of the top of the spray tip assembly 20, in a non-atomized state, to a flexible tubing 14 which routes the paint flow to a handheld paint dispensing accessory.

The discussion accompanying FIGS. 1-11 demonstrates that spray gun adapter 12 (shown in FIG. 5D) provides an operator of spray gun 10 (shown in FIG. 1) with an easy way to utilize spray gun 10 to provide paint to an accessory such as pressure-fed paint roller 16 (shown in FIG. 1). No tools are required to replace spray tip 38 (shown in FIG. 2) with spray gun adapter 12 (shown in FIG. 5D). An operator may quickly remove spray tip 38 from spray tip assembly 20 (shown in FIG. 2) and replace it with spray gun adapter 12 by hand. Spray gun adapter 12 may then be connected to an accessory such as pressure-fed paint roller 16 using threaded coupler 118 and tubing 14.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus for supplying paint under pressure to a paint applicator, the apparatus comprising:
- a spray gun comprising:
  - a housing;
  - a fluid pump having an outlet disposed within the housing; and
  - a spray tip assembly fluidly connected to the outlet of the fluid pump and having a bore for receiving and holding a spray tip, and a connector, wherein the spray tip assembly is able to be removed from and reattached to the spray gun via the connector; and
- a spray gun adapter configured to be installed in the bore of the spray tip assembly in place of the spray tip by removing the spray tip from the bore of the spray tip assembly and installing the spray gun adapter into the bore of the spray tip assembly without removing the spray tip assembly from the spray gun, the spray gun adapter including an adapter inlet, an adapter outlet, and an adapter bore within the spray gun adapter that establishes a flow passage between the adapter inlet and the adapter outlet, so that when the spray gun adapter is installed in the bore of the spray tip assembly of the spray gun and the fluid pump is activated, a fluid flow is established from the fluid pump of the spray gun into the adapter inlet, through the adapter bore, to the adapter outlet, and thereby through the spray gun adapter to an applicator accessory connected to the adapter outlet.

2. The apparatus of claim 1, wherein the spray gun adapter is configured to work with a seal installed in the spray tip assembly so that a seal is formed around the adapter inlet.

3. The apparatus of claim 1, wherein the spray gun adapter includes a cavity fluidly connected to the adapter outlet, wherein the cavity and the adapter outlet are configured to receive a coupler for connecting the spray gun adapter to a tube connected to the applicator accessory.

4. The apparatus of claim 3, wherein the coupler has a first end configured to be installed in the cavity, and a second end configured to be inserted into an end of the tube to establish fluid communication between the adapter outlet and the applicator accessory.

5. The spray gun adapter of claim 4, wherein the cavity is threaded.

6. An apparatus comprising:
- a spray gun;
- a spray tip assembly; and
- a spray gun adapter configured to be installed in a bore of the spray tip assembly of the spray gun in place of a spray tip, the spray tip assembly also having a connector which releasably attaches the spray tip assembly to the spray gun, the spray gun adapter establishing fluid communication between an outlet of a fluid pump of the spray gun and a paint roller connected to a tube, wherein the spray gun adapter, when installed in the bore of the spray tip assembly and connected to an end of the tube, provides a flow path that directs fluid from the spray gun through the adapter and through the tube to the paint roller for paint application, wherein the spray gun adapter includes an adapter body having an adapter inlet, an adapter outlet, and a bore that extends within the adapter body from the adapter inlet to the adapter outlet, and wherein the spray gun adapter is configured to be installed in the bore of the spray tip assembly by removing the spray tip from the bore of the spray tip assembly and installing the spray gun adapter into the bore of the spray tip assembly without removing the spray tip assembly from the spray gun.

7. The apparatus of claim 6, wherein the spray gun adapter is configured to work with a seal installed in the spray tip assembly so that a seal is formed around the adapter inlet.

8. An apparatus comprising:

a spray gun;

a spray tip assembly attached to the spray gun and having a bore for receiving and holding a spray tip; and a spray gun adapter configured to be installed in the bore of the spray tip assembly of the spray gun in place of the spray tip, the spray gun adapter establishing fluid communication between a fluid pump of the spray gun and a tube connected to an applicator accessory, wherein the spray gun adapter is configured to engage the spray tip assembly so that, when a cylindrical portion of the spray gun adapter is installed in the bore of the spray tip assembly and a coupler is connected between the spray gun adapter and the tube, a flow path is established that directs fluid from the spray gun through the spray gun adapter, to the tube connected to the applicator accessory for paint application, so that fluid communication is established between the spray gun and the applicator accessory, wherein the spray gun adapter includes an adapter body having an adapter inlet, an adapter outlet, and an adapter bore that extends within the adapter body from the adapter inlet to the adapter outlet, and wherein the spray gun adapter is configured to be installed in the bore of the spray tip assembly by removing the spray tip from the bore of the spray tip assembly and installing the spray gun adapter into the bore of the spray tip assembly without removing the spray tip assembly from the spray gun.

9. The apparatus of claim 8, wherein the spray gun adapter further comprises:

a handle portion that extends radially outward from the adapter body.

10. The apparatus of claim 8, wherein the spray gun adapter is configured to work with a seal installed in the spray tip assembly so that a seal is formed between an inlet of the spray gun adapter and the spray gun.

11. An apparatus for supplying paint under pressure to a paint applicator, the apparatus comprising:

a spray gun comprising:

a housing;

a fluid pump having an outlet disposed within the housing; and a spray tip assembly fluidly connected to the outlet of the fluid pump at a rear end of the spray tip assembly and having a bore in a side of the spray tip assembly configured for receiving and holding a spray tip so that an inlet of the spray tip is aligned with and in fluid communication with the outlet of the fluid pump, and a front end of the spray tip assembly, wherein when the spray tip is aligned with and in fluid communication with the outlet of the fluid pump and the fluid pump is activated, paint is atomized and flows out the front end of the spray tip assembly; and a spray gun adapter configured to be installed in the bore of the spray tip assembly in place of the spray tip, the spray gun adapter comprising:

an adapter body having a first portion configured to fit in the bore of the spray tip assembly and a second portion configured to extend out of the bore of the spray tip assembly;

an adapter inlet configured to be aligned with and in fluid communication with the outlet of the fluid pump when the first portion of the adapter body is located in the bore;

an adapter outlet in fluid communication with the adapter inlet, so that when the first portion of the adapter body is located in the bore and the fluid pump is activated, fluid flow is established from the fluid pump of the spray gun through the adapter inlet, through the adapter outlet, and thereby through the adapter body and the spray gun adapter, and to an applicator accessory connected to the adapter outlet; and an adapter bore within the adapter body that connects the adapter inlet and the adapter outlet;

wherein the spray gun adapter is configured to be installed in the bore of the spray tip assembly by removing the spray tip from the bore of the spray tip assembly and installing the spray gun adapter into the bore of the spray tip assembly without removing the spray tip assembly from the spray gun.

12. The apparatus of claim 11, wherein the spray gun adapter further comprises:

a handle portion that extends radially outward from the second portion of the adapter body.

13. The apparatus of claim 11, wherein the spray gun adapter is configured to work with a seal installed in the spray tip assembly of the spray gun so that a seal is formed around the adapter inlet.

14. The apparatus of claim 11, wherein the spray gun adapter further comprises a cavity located between the adaptor outlet and the adaptor bore and fluidly connecting the adaptor outlet to the adaptor bore, wherein the adapter outlet and the cavity are configured to receive a coupler for connecting the adapter to the applicator accessory.

15. A method for dispensing paint from an accessory using the apparatus according to claim 11, the method comprising:

removing by hand the spray tip from the bore of the spray tip assembly;

installing the spray gun adapter in the bore of the spray tip assembly by hand so that the spray gun adapter is in communication with the outlet of the fluid pump;

connecting a tube between the applicator accessory and the spray gun adapter; and dispensing fluid through the applicator accessory using the spray gun to deliver the fluid;

wherein the spray gun adapter is configured to connect the applicator accessory to the spray gun through the spray gun adapter and the tube to the applicator accessory.

16. The method of claim 15, wherein removing by hand the spray tip from the bore of the spray tip assembly connected to the spray gun further comprises:

rotating the spray tip 90 degrees; and pulling the spray tip out of the bore of the spray tip assembly.

17. The method of claim 15, wherein installing the spray gun adapter in the bore of the spray tip assembly by hand further comprises:

inserting the first portion of the spray gun adapter into the bore of the spray tip assembly.

18. A method for dispensing paint from an application accessory using a spray gun, the method comprising:

removing by hand a spray tip from a bore in a side of a spray tip assembly without disconnecting the spray tip assembly from the spray gun, the spray tip assembly connected to an outlet of a fluid pump within the spray gun;

installing a spray gun adapter in the bore of spray tip assembly by hand so that the spray gun adapter is in fluid communication with the outlet of the fluid pump;

connecting tubing between an applicator accessory and the spray gun adapter; and dispensing fluid from the spray gun, through the spray gun adapter and the tube to the applicator accessory to dispense paint from the applicator accessory:

wherein the spray gun adapter includes an adapter body having an adapter inlet, an adapter outlet, and a bore that extends within the adapter body from the adapter inlet to the adapter outlet; and wherein the spray gun adapter is configured to be installed in the bore of the spray tip assembly by removing the spray tip from the bore of the spray tip assembly and installing the spray gun adapter into the bore of the spray tip assembly without removing the spray tip assembly from the spray gun.

19. The method of claim 18, wherein connecting an accessory to the spray gun adapter further comprises:

inserting the first end of a coupler into one end of the tubing connected to the applicator accessory, and inserting a second end of the coupler into the spray gun adapter.

* * * * *